United States Patent
Shin

(10) Patent No.: US 7,548,399 B2
(45) Date of Patent: Jun. 16, 2009

(54) HEAD STACK ASSEMBLY PROTECTING MEMBER AND METHOD FOR INSTALLING HEAD STACK ASSEMBLY IN HARD DISK DRIVE USING THE SAME

(75) Inventor: Sang-chul Shin, Osan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 474 days.

(21) Appl. No.: 11/411,868

(22) Filed: Apr. 27, 2006

(65) Prior Publication Data

US 2007/0081272 A1   Apr. 12, 2007

(30) Foreign Application Priority Data

Oct. 10, 2005   (KR) ..................... 10-2005-0094918

(51) Int. Cl.
*G11B 21/12* (2006.01)
(52) U.S. Cl. ................................... 360/254.7
(58) Field of Classification Search ............. 360/254.7, 360/254.8, 255; 29/737
See application file for complete search history.

(56) References Cited

U.S. PATENT DOCUMENTS

| | | | | |
|---|---|---|---|---|
| 6,580,585 | B2 * | 6/2003 | Feliss et al. | 360/254.8 |
| 7,433,158 | B2 * | 10/2008 | Koh et al. | 360/254.7 |
| 2002/0186510 | A1 * | 12/2002 | Feliss et al. | 360/254.8 |
| 2005/0018354 | A1 * | 1/2005 | Takahashi | 360/254.8 |
| 2005/0030671 | A1 * | 2/2005 | Lee et al. | 360/255 |
| 2005/0207066 | A1 * | 9/2005 | Kobayashi et al. | 360/255 |
| 2005/0280945 | A1 * | 12/2005 | Duvall et al. | 360/254.7 |
| 2005/0286171 | A1 * | 12/2005 | Kim et al. | 360/254.7 |
| 2006/0117558 | A1 * | 6/2006 | Koh et al. | 29/737 |

FOREIGN PATENT DOCUMENTS

| | | |
|---|---|---|
| JP | 08-102156 | 4/1996 |
| JP | 11-96707 | 4/1999 |
| KR | 2000-47475 | 7/2000 |
| KR | 2004-08364 | 1/2004 |

* cited by examiner

*Primary Examiner*—Tianjie Chen
(74) *Attorney, Agent, or Firm*—Staas & Halsey LLP

(57) ABSTRACT

A head stack assembly (HSA) protecting member to be installed in the HSA to protect the HSA, and a method of installing the HSA in a hard disk drive (HDD) by using the HSA protecting member are provided. The HSA protecting member includes a first spacer which is interposed between front ends of a pair of suspensions on which a pair of sliders facing each other are mounted, respectively, and which projects to prevent both front ends of the suspensions from contacting each other; a pair of limiters formed above and below the first spacer, such that the front ends of the pair of suspensions can be inserted into the suspension receiving portions, respectively, to restrain the front ends of the suspensions from shaking up and down; and an installation pin formed opposite the first spacer and the limiters and inserted into the HSA.

13 Claims, 8 Drawing Sheets

HEAD STACK ASSEMBLY PROTECTING MEMBER AND METHOD FOR INSTALLING HEAD STACK ASSEMBLY IN HARD DISK DRIVE USING THE SAME

CROSS-REFERENCE TO RELATED APPLICATIONS

This application claims the benefit of Korean Patent Application No. 10-2005-0094918, filed on Oct. 10, 2005, in the Korean Intellectual Property Office, the disclosure of which is incorporated herein in its entirety by reference.

BACKGROUND OF THE INVENTION

1. Field of the Invention

The present invention relates to a hard disk drive (HDD), and more particularly, to a head stack assembly (HSA) protecting member to prevent the HSA from being damaged by installing the HSA protecting member in the HSA.

2. Description of the Related Art

A hard disk drive (HDD) is an example of an auxiliary memory used in computers, MP3 players, mobile phones, and so on, for storing and reproducing data on a disk using a slider with a magnetic head. The HDD includes a head stack assembly (HSA) for moving the slider to a specific position on the disk so as to record or read data.

Generally, HSAs can be classified into E-block types, where a suspension supporting the slider is connected with the end of an E-shaped block, and unimount types, where a plate arm supporting the slider is stacked and connected. The E-block type HSA has the advantage of being easy and inexpensive to manufacture, but is difficult to miniaturize. Thus, the unimount type HSA is usually used in a small HDD using a disk of 1-0.8 inches in diameter.

The unimount type HSA used in the small HDD is usually transported and stored disassembled, since it is easy to damage after assembly. To manufacture the HDD, the parts are assembled as into a HSA and then the HSA is installed on a base member of the HDD. These processes increase the cost of manufacturing the HDD, and thus there is a need for a system for transporting and maintaining HSA end products with minimum loss.

SUMMARY OF THE INVENTION

The present invention provides a head stack assembly (HSA) protecting member which is capable of restraining shaking of the HSA by external disturbance when the HSA protecting member is installed in the HSA.

The present invention also provides a method of installing the HSA in a HDD (hard disk drive), without any damage, by using the HSA member.

According to an aspect of the present invention, there is provided a HSA protecting member to be installed on a HSA. The HSA includes a pair of sliders for recording data on a disk or reading the data recorded on the disk, and a pair of suspensions with the sliders positioned at their respective front ends. The HSA protecting member prevents the HSA from being damaged and includes: a first spacer to be interposed, in use, between the front ends of the pair of suspensions on which the pair of sliders facing each other are mounted, respectively, and the first spacer projecting outward to prevent both front ends of the suspensions from contacting each other; a pair of limiters formed above and below the first spacer, with suspension receiving portions between the first spacer and the pair of limiters such that the front ends of the pair of suspensions can be inserted into the suspension receiving portions; and an installation pin formed opposite both the first spacer inserted into in the HSA.

The HSA protecting member may further include a second spacer to be interposed between rear ends of the pair of suspensions and projecting to prevent both rear ends of the suspensions from contacting each other.

The length of the first spacer may be equal to or longer than the length of the second spacer.

The first spacer or the second spacer may be tapered such that it is easily interposed between the pair of suspensions.

The HSA may include two or more pairs of sliders and two or more pairs of suspensions, and the HSA protecting member may include two or more first spacers, two or more second spacers, and two or more pairs of limiters corresponding to the number of sliders and suspensions.

The suspension of the HSA may include a flexure to which the slider is attached and a load beam to which the flexure is attached, and the first spacer may include a load beam supporting portion for supporting a front end of the load beam and a flexure supporting portion, having a stepped difference from the load beam supporting portion, for supporting a front end of the flexure.

The front end of the installation pin may pass entirely through the HSA and project out the other side of the HSA.

The first spacer and the limiters may be curvedly projected so as not to contact with a base member of the HDD when the HSA is installed in the HDD.

The first spacer and the limiters may be extended along a circular arc around the installation pin.

The width of the first spacer and the limiter may be determined so as not to interfere with the base member of the HDD when the HSA is installed in the HDD.

The HSA protecting member may include a bend formed to prevent the HSA protecting member installed in the HSA from interfering with a flange on an upper side of the HSA.

According to another aspect of the present invention, there is provided a method of installing a HSA in a HDD, including: installing, in the HSA including a slider for recording data on a disk or reading the data recorded on the disk and a suspension having the slider on its front end, a HSA protecting member including a first spacer projecting to prevent both front ends of a pair of suspensions from contacting each other, a pair of limiters formed above and below the first spacer with suspension receiving portions between the first spacer and the pair of limiters, such that the front ends of the pair of suspensions can be inserted into the suspension receiving portions respectively, and an installation pin formed opposite the first spacer and the limiters; pivotably installing the HSA with the HSA protecting member in a base member of a HDD; pivoting the HSA with the HSA protecting member in one direction such that the first spacer and the limiters come into contact with a ramp; parking the HSA on the ramp of the HDD by pivoting the HSA only in one direction; and separating the HSA protecting member from the HSA.

The installing of the HSA protecting member in the HSA may further include inserting the installation pin into the HSA; and receiving the front ends of the pair of suspensions in the suspension receiving portions by pivoting the HSA protecting member around the installation pin.

The HSA protecting member may further include a second spacer protecting to prevent the rear ends of the pair of suspensions from contacting each other, so that the second spacer may be the second spacer is interposed between the pair of suspensions when the HSA protecting member pivots around the installation pin.

The separating of the HSA protecting member from the HSA may include removing the second spacer from the suspensions, and removing the installation pin from the HSA by pivoting the HSA protecting member in the opposite direction to that when installing the HSA protecting member in the HSA.

Additional aspects and/or advantages of the invention will be set forth in part in the description which follows and, in part, will be apparent from the description, or may be learned by practice of the invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

A head stack assembly (HSA) protecting member and a method of installing a HSA in a hard disk drive (HDD) by using the HSA protecting member in accordance with an embodiment of the present invention will now be described more fully with reference to the accompanying drawings.

Figure 1:
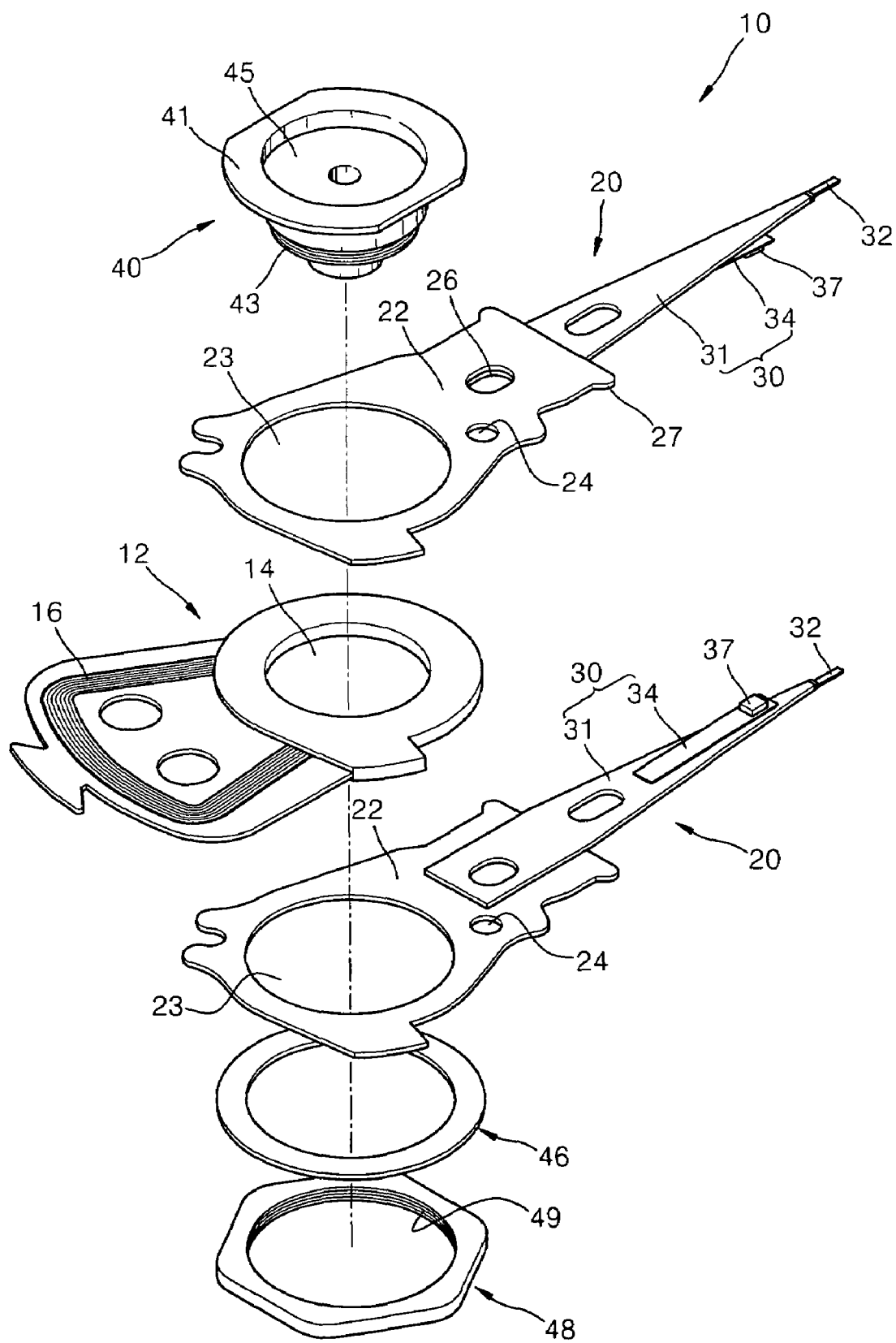
FIG. 1 is an exploded perspective view illustrating one example of a head stack assembly (HSA)

FIG. 1 is an exploded perspective view illustrating one example of a unimount type HSA.

With reference to FIG. 1, the HSA 10 includes a pair of arms 20 with sliders 37; a tail member 12 with a voice coil 16, and a coupling stud 40 passing through and connecting the arms 20 and the tail member 12. The arm 20 includes an arm base 22 having a connection hole 23 to receive the coupling stud 40, a suspension 30 to be connected to one end of the arm base 22, and a slider 37 mounted at the front end of the suspension 30. An installation hole 24 for installing a HSA protecting member 100 is formed at one side of the arm base 22. The HSA protecting member 100 will be described later. Reference numeral 26 denotes a swaging hole required for swage-connecting the arm base 22 and the suspension 30.

The suspension 30 is connected with the arm base 22 and includes a load beam 31 for pressing the slider 37 onto a disk 55 (referring to FIGS. 6 through 8) when a hard disk drive (HDD) 50 (referring to FIGS. 6 through 8) is in operation, and a flexure 34 having one end attached to the slider 37 and the other end connected to the load beam 31. The front end of the load beam 31 includes an end-tap 32 positioned on a ramp 60 (referring to FIGS. 6 through 8) to be supported when the slider 37 is unloaded.

A pair of sliders 37 included in a pair of arms 20 are arranged to face each other. When the HDD 50 is in operation, a magnetic head (not shown) formed on each slider 37 writes data on the disk 55 or reads data from the disk 55.

The tail member 12 is provided with the connection hole 14 to receive the coupling stud 40. The tail member 12 is positioned between the pair of arms 20 and spaces the pair of arms 20 at a predetermined gap.

The coupling stud 40 includes an outwardly extending flange 41. The flange 41 projects by its thickness from the upper arm base 22 in the assembled HSA 10. A pivot bearing 45 is included inside the coupling stud 40. A male screw thread 43 is formed at the bottom of the coupling stud 40. When assembling the coupling stud 40 passes through the pair of arms 20 and the tail member 12, with a nut 48 having a female screw thread 49 being screwed onto the male screw thread 43 and tightened to join the coupling stud 40, the pair of arms 20 and the tail member 12. A washer 46 is interposed between the nut 48 and the lower arm 20.

Figure 2:
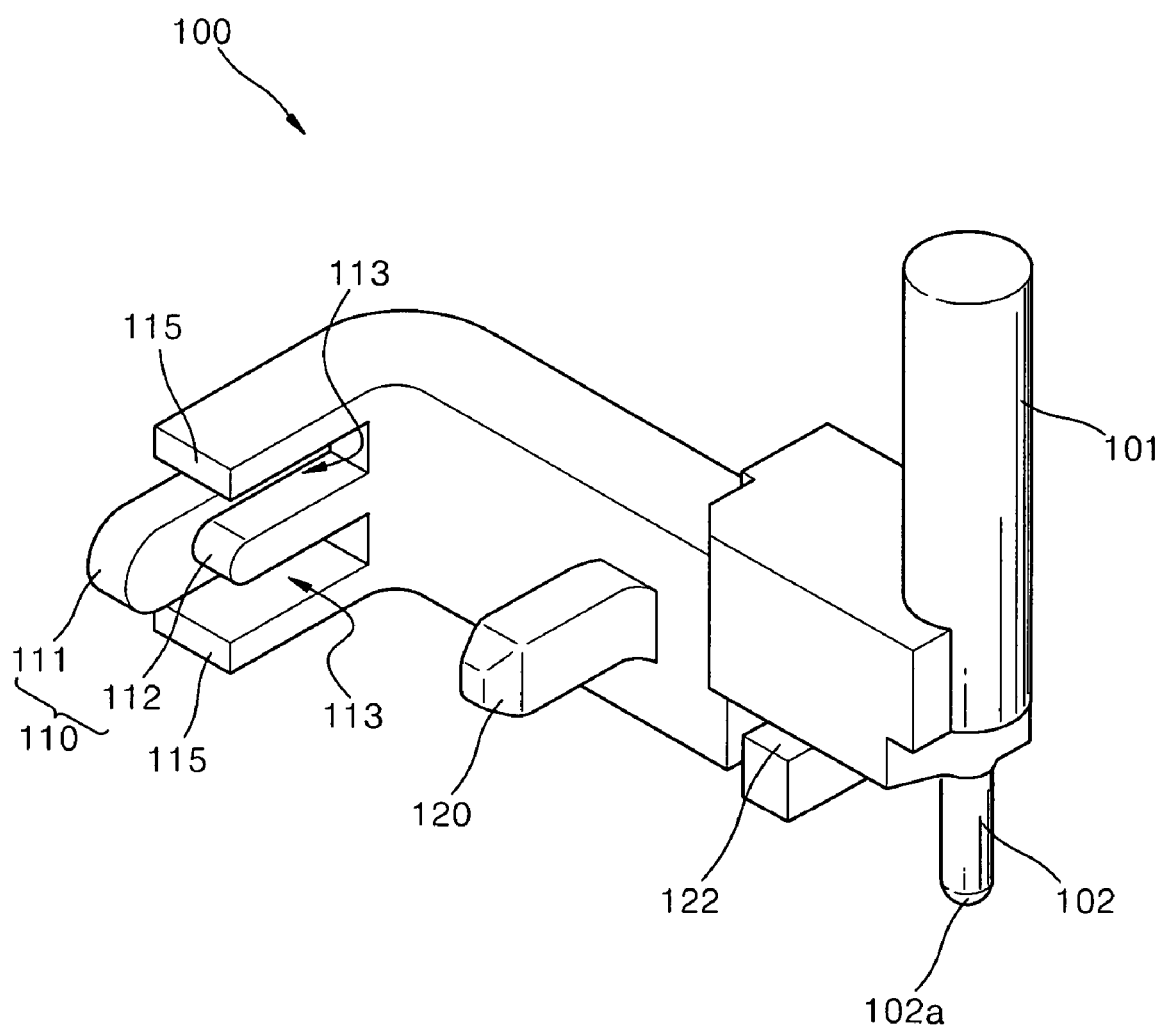
FIGS. 2 and 3 are perspective views from other directions illustrating a HSA protecting member in accordance with an embodiment of the present invention.
Figure 3:
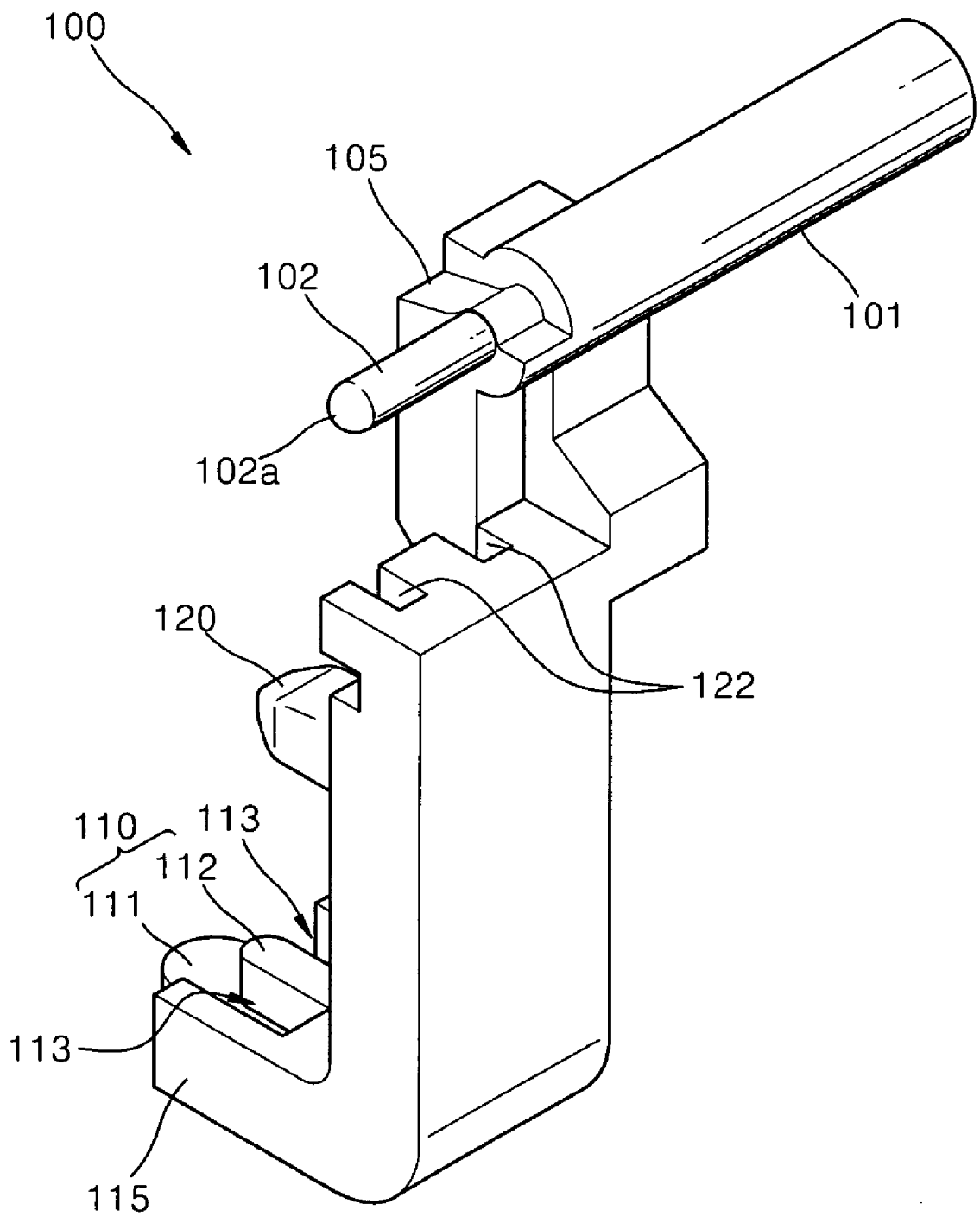
Figure 4:
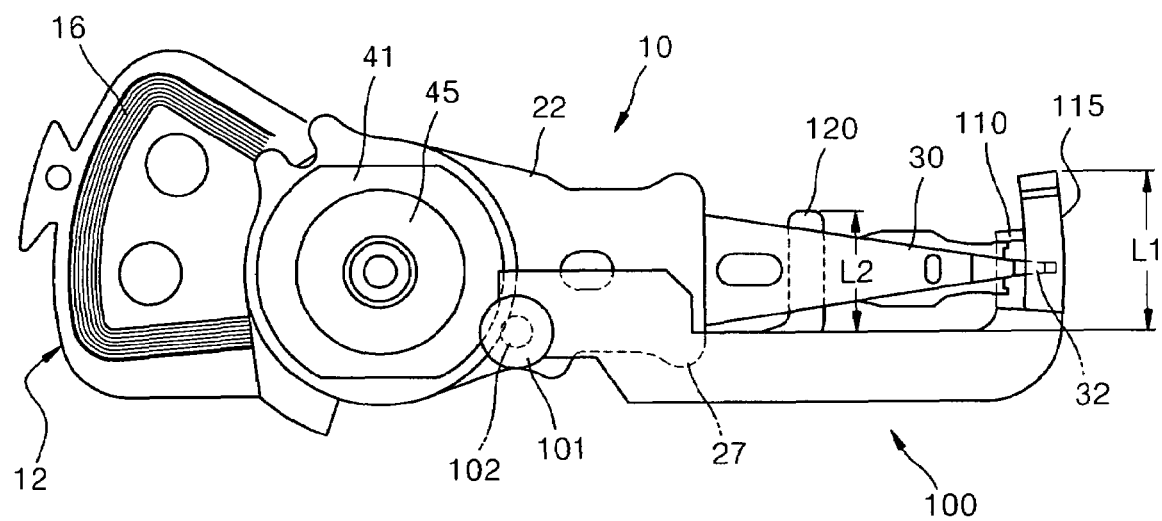
FIG. 4 is a plane view illustrating the HSA with the HSA protecting member of FIGS. 2 and 3.
Figure 5:
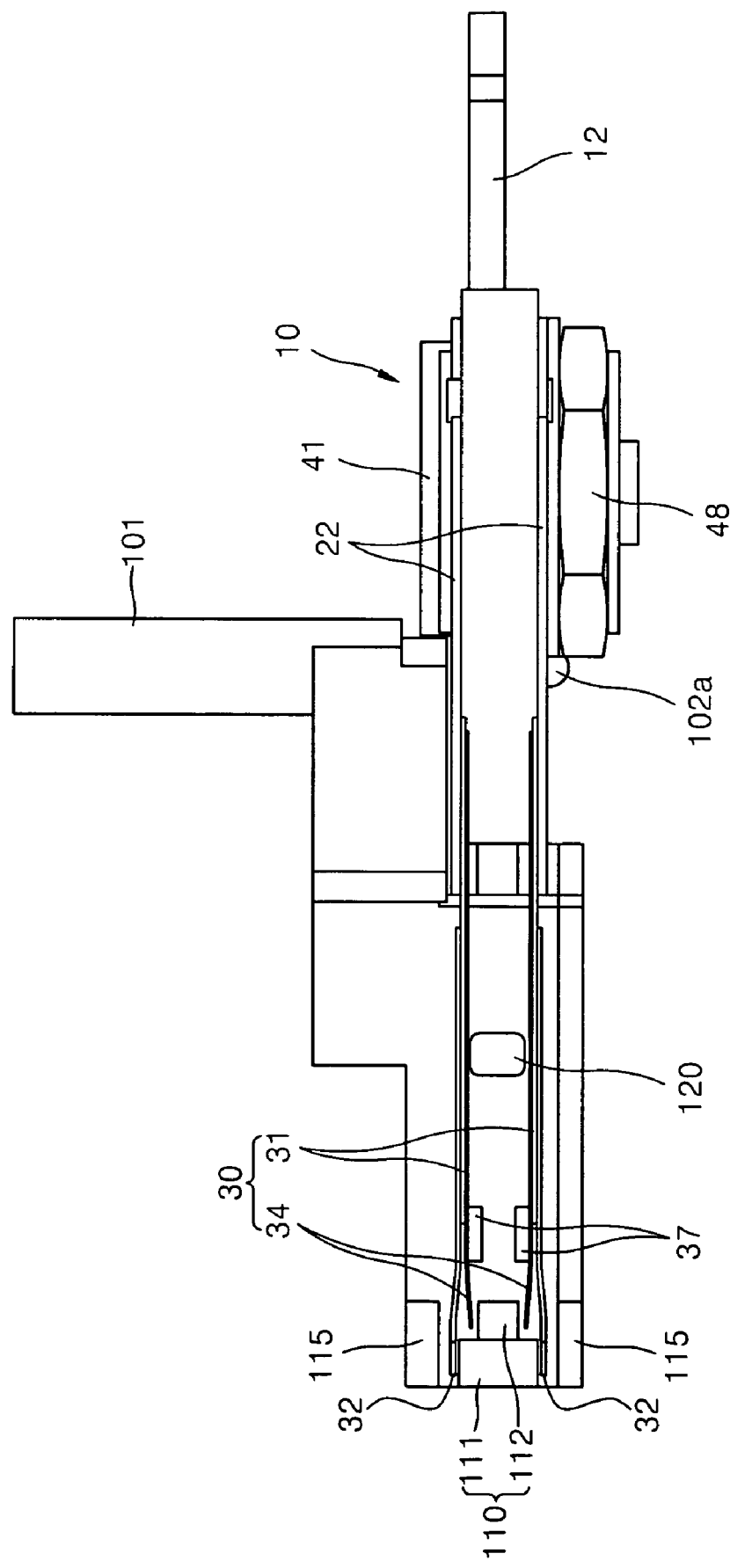
FIG. 5 is a side view illustrating the HSA with the HSA protecting member of FIGS. 2 and 3.

FIGS. 2 and 3 are perspective views from other directions illustrating the HSA protecting member in accordance with an embodiment of the present invention, and FIGS. 4 and 5 are a plane view and a side view illustrating the HSA with the HSA protecting member of the FIGS. 2 and 3.

With reference to FIGS. 2 and 3, the HSA protecting member 100 can be formed by plastic resin molding. The HSA protecting member 100 includes an installation pin 102 on one side to be inserted into the installation hole 24 (referring to FIG. 1) of the HSA 10, and a handle 101 formed at an extension line of the installation pin 102. The HSA protecting member 100 includes a first spacer 110 and a pair of limiters 115 on its other side and a second spacer 120 in its middle.

The first spacer 110 has an end which is tapered to easily fit between the front ends of the pair of suspensions 30 (which are approximately parallel) and protect both front ends of the suspensions 30 from contacting each other. The first spacer 110 includes a load beam supporting portion 111 for supporting the end-tap 32 of the front end of the load beam 31, and a flexure supporting portion 112 having a stepped difference from the load beam supporting portion 111, for supporting a free end of the flexure 34 to which the slider 37 is attached. The free end of the flexure 34 is blocked by the flexure supporting portion 112 and the load beam 31, and is thus unable to shake up and down, preventing any damage by collision between the sliders 37 in the HSA 10 with the HSA protecting member 100.

The pair of limiters 115 are formed above and below the first spacer 110 and are spaced apart from the first spacer 110 such that the pair of suspensions 30 are inserted into suspension receiving portions 113 (to be described below). When the HSA protecting member 100 is installed in the HSA 10, the front end of each suspension 30 is received in a suspension receiving portion 113 which is located between the first spacer 110 and the limiter 115, such that the front end of the suspension 30 received in each suspension receiving portion 113 is restrained from shaking up and down by the first spacer 110 and the limiter 115. Specifically, the limiters 115 limit the pair of suspensions 30 to prevent the suspensions 30 from moving apart from each other. Without the limiters 115, the pair of suspensions 30 may be dislodged from their original position by external impact and then are moved to their original position by the elastic force. In this case, the pair of suspensions 30 may collide with each other. The limiters 115 prevent such damage.

The second spacer 120 is interposed between the rear ends of the pair of suspensions 30, adjacent to the arm base 22, and projects to prevent the rear ends of the suspensions 30 from contacting each other. An end of the second spacer 120 is tapered so that it can easily pass between the rear ends of the pair of suspensions 30.

When the installation pin 102 is inserted into the installation hole 24 of the HSA 10 by holding the handle 101, and the HSA protecting member 100 rotates around the installation pin 102, the first spacer 110 and the second spacer 120 are interposed between the pair of suspensions 30, and the front ends of the pair of suspensions 30 are received in the suspension receiving portion 113. The HSA protecting member 100 is installed in the HSA 10 in this state.

The first spacer 110 is positioned further from the installation pin 102 than the second spacer 120. Thus, if the length L2 of the second spacer 120 is greater than the length L1 of the first spacer 110, when the HSA protecting member 100 is installed in the HSA 10, only the second spacer 120 is interposed between the pair of suspensions 30 and the first spacer 110 may not be inserted. Further, when the HSA protecting member 100 is separated from the HSA 10, the first spacer 110 is removed between the suspensions 30, but the second spacer 120 may not be removed from between the suspensions 30. To solve these problems, in the HSA protecting member 100 in accordance with the embodiment of the present invention, the length L1 of the first spacer 110 is designed to be one or two times the length L2 of the second spacer 120.

The flange 41 projects around the installation hole 24 of the HSA 10, as shown in FIG. 1. In the process of installing the HSA protecting member 100 in the HSA 10, interference may occur between the HSA protecting member 100 and the flange 41. For example, the installation pin 102 may not be inserted into the installation hole 24 or the HSA protecting member 100 where the installation pin 102 is inserted may not rotate the HSA 10 since the flange 41 blocks by the HSA protecting member 100. The HSA protecting member 100 according to the embodiment includes a bend 105 around the installation pin 102 to prevent interference with the flange 41. An arm base projection portion 27 is formed in the arm base 22 of the HSA 10, and an arm base receiving portion 122 is arranged in the HSA protecting member 100 corresponding to the arm base projection portion 27.

If the installation pin 102 is short, the HSA protecting member 100 is not firmly supported in the HSA 10, and the first spacer 110 and the limiters 115 positioned at the opposite side to the installation pin 102 are inclined up or down. Consequently, the suspensions 30 of the HSA 10 may permanently deform, and, their elastic characteristics such as Young's modulus may change. In the HSA protecting member 100 in accordance with the embodiment, the front end 102a of the installation pin 102 passes through the pair of arm bases 22 of the HSA 10, and the installation pin 102 is extended so as to project to the lower side of the HSA 10, thereby solving the above problem.

The first spacer 110 and the limiters 115 of the HSA protecting member 100 are curvedly projected so as not to contact with a peripheral boundary portion 53 (referring to FIGS. 6 through 8) of the base member 51 in the process of installing the HSA 10 in the base member 51 (referring to FIGS. 6 through 8), and the first spacer 110 and the limiters 115 are extended along a circular arc around the installation pin 102 in the embodiment as shown.

Figure 6:
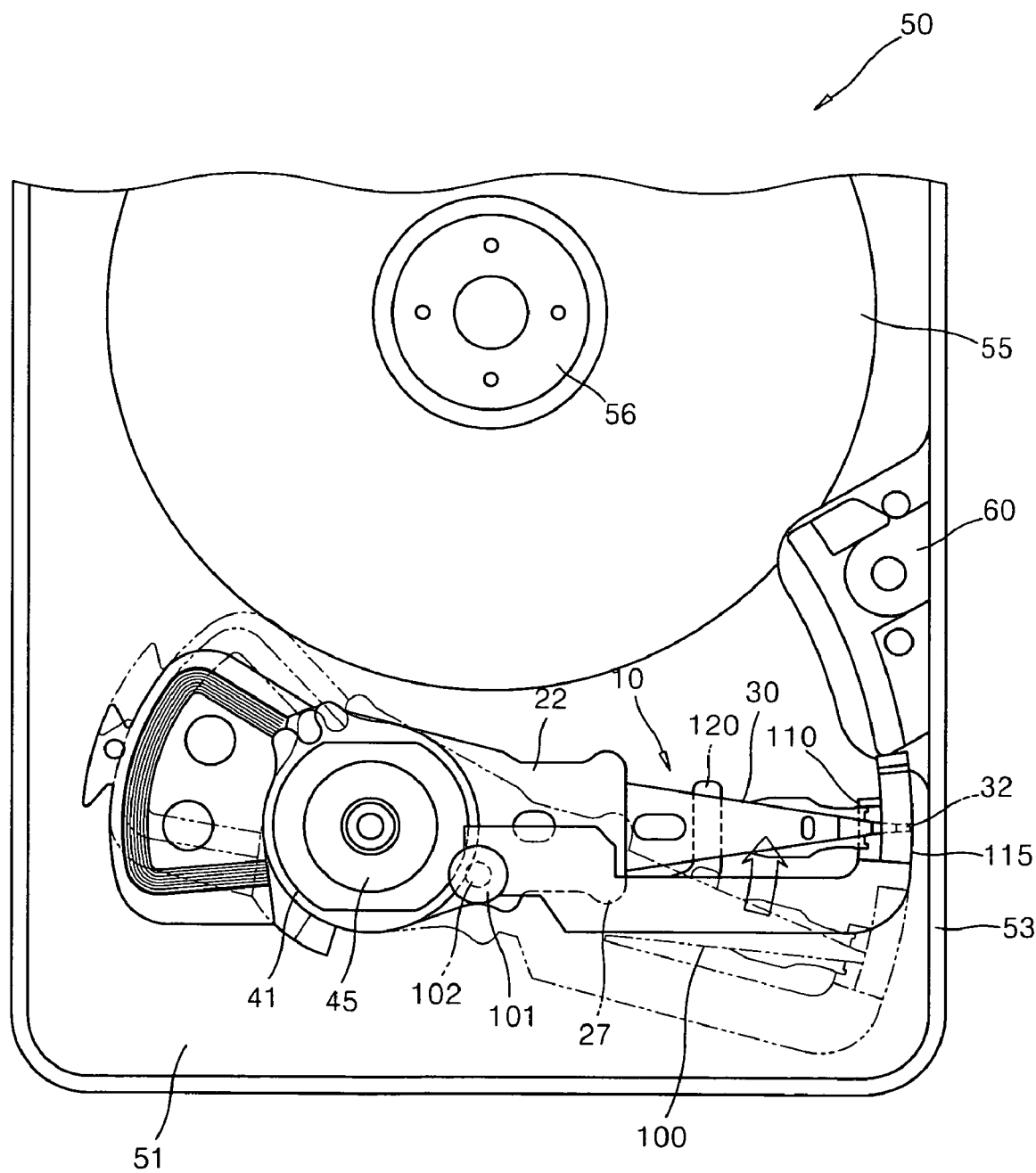
FIGS. 6 through 8 are plane views illustrating the installation of the HSA on a hard disk drive (HDD).
Figure 7:
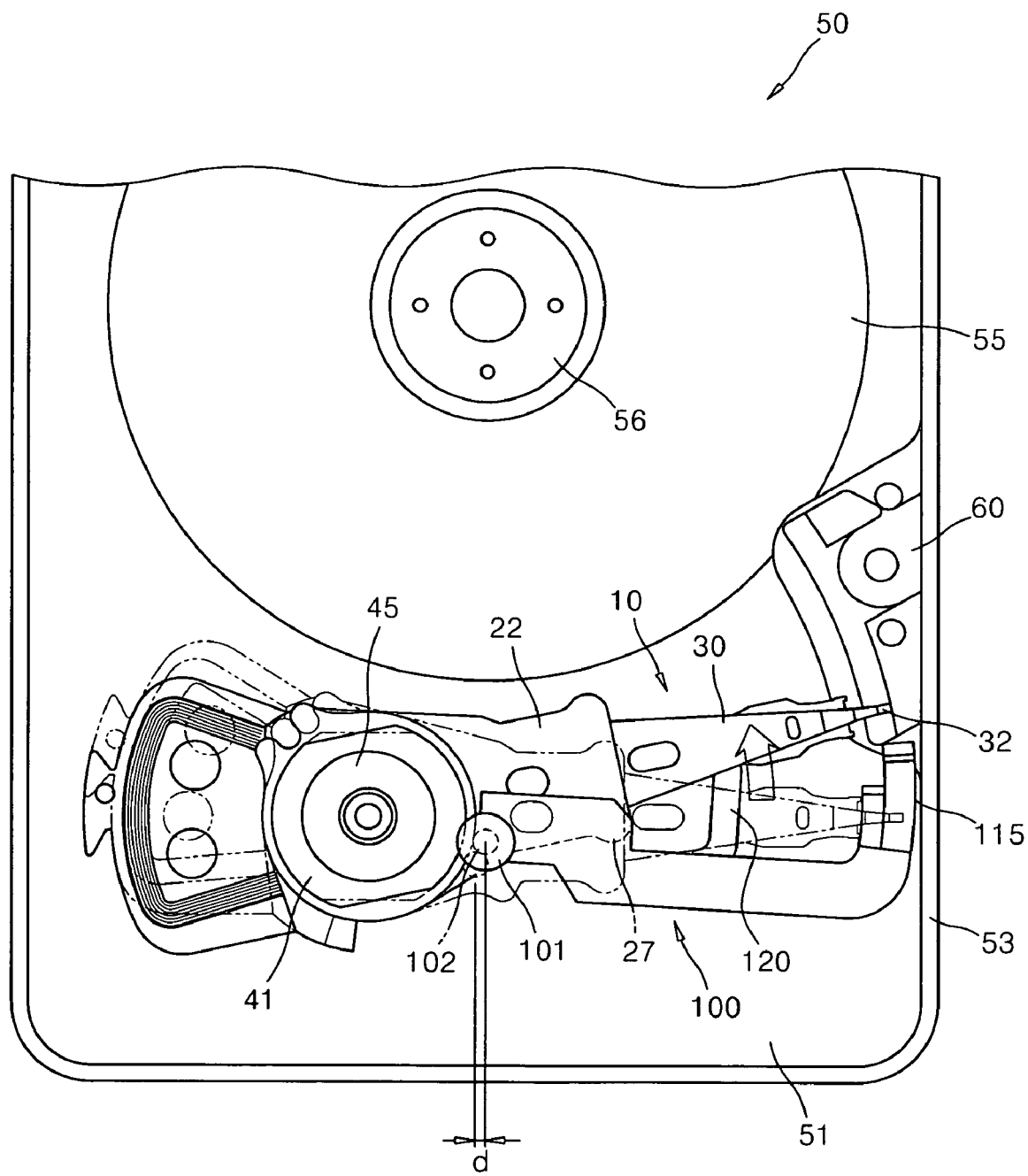
Figure 8:
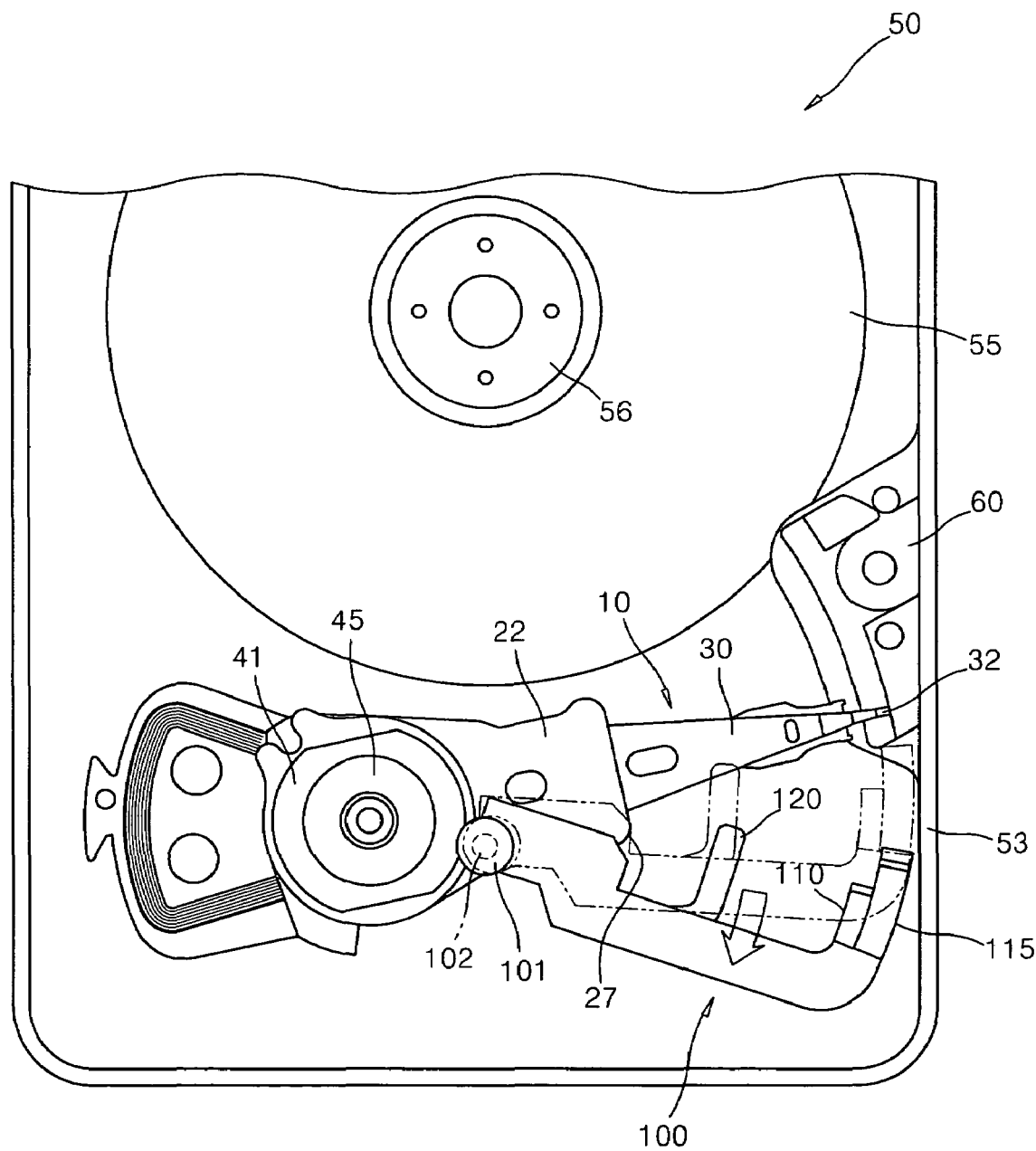

FIGS. 6 through 8 are plane views sequentially illustrating the installation of the HSA in the HDD. A method of installing the HSA 10 in the HDD by using the HSA protecting member 100 will be described below with reference to FIGS. 6 through 8.

After the HSA 10 is assembled, the HSA protecting member 100 is installed in the HSA 10 such that the HSA 10 is not damaged during transportation or storage. The method of installing the HSA protecting member 100 in the HSA 10 has been described above.

With reference to FIG. 6, the HSA 10 on which the HSA protecting member 100 is installed in the above-described manner is installed in the base member 51 so as to be pivotable around the pivot bearing 45. As the HSA 10 pivots counter-clockwise around the pivot bearing 45, the ends of the first spacer 110 and the limiters 115 of the HSA protecting member 100 come into contact with the ramp 60. Then, only the HSA 10 pivots further counter-clockwise to park on the ramp 60 as shown in FIG. 7. In this state, the end-tap 32 of the front end of the suspension 30 is placed on the ramp 60 and supported so as not to shake. The first spacer 110 and the limiters 115 of the HSA protecting member 100 are blocked by the ramp 60 and separated from the suspensions 30 of the HSA 10.

As the HSA 10 pivots around the pivot bearing 45, the position of the installation pin 102 of the HSA protecting member 100, which is inserted into the installation hole 24 (referring to FIG. 1), is moved in width direction of the base member 51 by a distance d, as shown in FIG. 7, and thus, the first spacer 110 and the limiters 115 become closer to the peripheral boundary portion 53 of the base member 51.

Then, as the HSA protecting member 100 turns clockwise as shown in FIG. 8, the second spacer 120 and the arm base receiving portion 122 (referring to FIGS. 2 and 3) are removed from the suspensions 30 and the arm base projecting portion 27, and the installation pin 102 is removed from the installation hole 24 (referring to FIG. 1), so that the HSA protecting member 100 is separated from the HSA 10. The first spacer 110 and the limiters 115 are curvedly projected and thus the first spacer 110 and the limiters 115 do not collide with the peripheral boundary portion 53 when the HSA protecting member 100 turns though the space between the first spacer 110 and the limiters 115 and the peripheral boundary portion 53 of the base member 51 is small. On the other hand, even if the first spacer 110 and the limiters 115 are straight projected, differently from those shown in FIG. 8, it is possible to avoid interference with the peripheral boundary portion 53 by designing the first spacer 110 and the limiters 115 to be narrow.

The HSA protecting member includes the first spacer and the limiters for restraining the front ends of the suspensions from shaking up and down, thereby preventing any damage by contact between the sliders or the suspensions which face each other, while the assembled HSA products are transported or stored. Furthermore, since damage to the HSA is prevented, manufacturing cost is reduced.

While the present invention has been particularly shown and described with reference to exemplary embodiments thereof, it will be understood by those of ordinary skill in the art that various changes in form and detail may be made therein without departing from the spirit and scope of the present invention as defined by the following claims. For example, corresponding to the HSA including two or more pairs of sliders and suspensions, the HSA protecting member may include two or more first spacers, two or more second spacers, and two or more pairs of limiters. The true scope of the present invention is defined by the claims.

What is claimed is:

1. A HSA (head stack assembly) protecting member to be installed in a HSA which includes a slider recording data on a disk or reading the data recorded in the disk, and a suspension having the slider mounted at its front end, to prevent the HSA from being damaged, the HSA protecting member comprising:

a first spacer interposed between front ends of a pair of suspensions on which a pair of sliders facing each other are mounted, respectively, to prevent both front ends of the suspensions from contacting each other;

a pair of limiters formed above and below the first spacer with suspension receiving portions between the first spacer and the pair of limiters such that the front ends of the pair of suspensions can be inserted into the suspension receiving portions, respectively, to restrain the front ends of the suspensions from shaking up and down; and an installation pin formed opposite the first spacer and the limiters and inserted into in the HSA.

2. The HSA protecting member of claim 1, further comprising a second spacer to be interposed between rear ends of the pair of suspensions to prevent both rear ends of the suspensions from contacting each other.

3. The HSA protecting member of claim 2, wherein the length of the first spacer is equal to or longer than the length of the second spacer.

4. The HSA protecting member of claim 2, wherein the first spacer or the second spacer is tapered such that it is easily interposed between the pair of suspensions.

5. The HSA protecting member of claim 2, wherein the HSA includes two or more pairs of sliders and two or more pairs of suspensions, and the HSA protecting member includes two or more first spacers, two or more second spacers, and two or more pairs of limiters, corresponding to the number of sliders and suspensions.

6. The HSA protecting member of claim 1, wherein each suspension of the HSA has a flexure to which the slider is attached and a load beam to which the flexure is attached, and the first spacer includes a load beam supporting portion supporting a front end of the load beam and a flexure supporting portion, having a stepped difference from the load beam supporting portion, supporting a front end of the flexure.

7. The HSA protecting member of claim 1, wherein a front end of the installation pin passes entirely through the HSA and projects out the other side of the HSA.

8. The HSA protecting member of claim 1, wherein the first spacer and the limiters are curvedly projected so as not to contact with a base member of a HDD (hard disk drive) when the HSA is installed in the HDD.

9. The HSA protecting member of claim 8, wherein the first spacer and the limiters are extended along a circular arc around the installation pin.

10. The HSA protecting member of claim 1, wherein the width of the first spacer and the limiters is determined so as not to interfere with the base member of a HDD when the HSA is installed in the HDD.

11. The HSA protecting member of claim 1, further comprising a bend formed such that the HSA protecting member installed in the HSA does not interfere with a flange of an upper side of the HSA.

12. The HSA protecting member of claim 1, further comprising a handle formed at an extension line of the installation pin.

13. The HSA protecting member of claim 1, wherein a front end of the installation pin is tapered.

* * * * *